L. C. SCHRAG.
TRAFFIC SIGNAL FOR AUTOMOBILES.
APPLICATION FILED MAY 13, 1921.

1,388,900.

Patented Aug. 30, 1921.

L. C. Schrag
INVENTOR.

BY

Egerton R. Case
ATTORNEY.

UNITED STATES PATENT OFFICE.

LOUIS CORNELIOUS SCHRAG, OF KITCHENER, ONTARIO, CANADA.

TRAFFIC-SIGNAL FOR AUTOMOBILES.

1,388,900.  Specification of Letters Patent.  Patented Aug. 30, 1921.

Application filed May 13, 1921. Serial No. 469,165.

*To all whom it may concern:*

Be it known that I, LOUIS CORNELIOUS SCHRAG, a subject of the King of Great Britain, residing in Kitchener, county of Waterloo, Province of Ontario, Canada, have invented certain new and useful Improvements in Traffic-Signals for Automobiles, of which the following is a specification.

My invention relates to improvements in traffic signals for automobiles, and the object of my invention is to provide a contrivance of the class set forth which may be visible at one or both sides of a vehicle, to a driver of a vehicle therebehind so as to indicate clearly the intended change in movement of the driver of the car ahead, the device being adapted to make such signals visible whether during night or day traffic, and in the following specification I shall disclose an embodiment within my invention, and what I claim as new will be set forth in the claims forming part of this specification.

Figure 1:
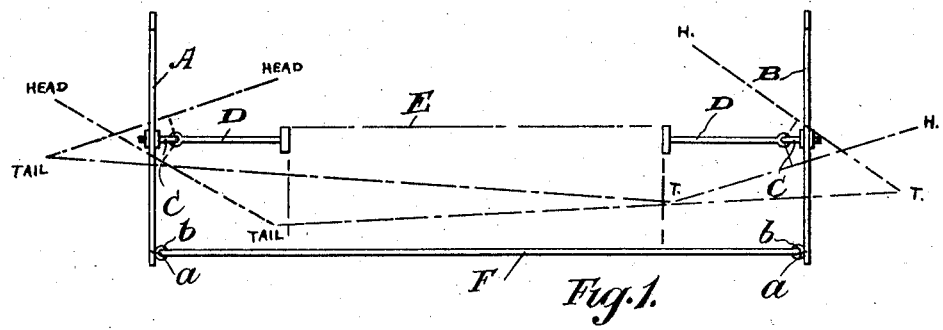
Figure 2:
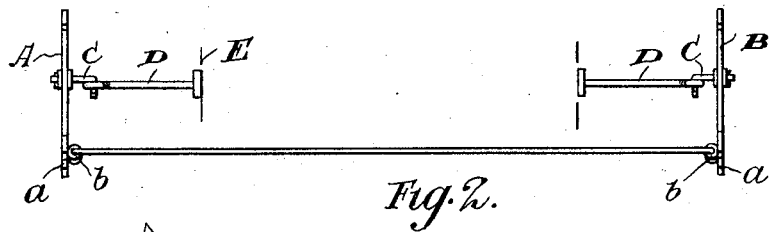
Figure 3:
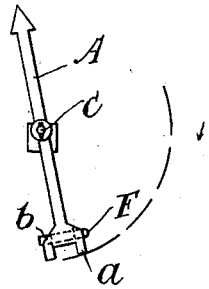
Figure 4:
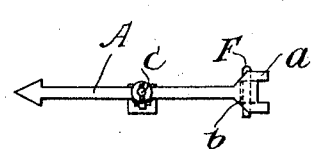

Figure 1 is a plan view of the preferred form of contrivance within my invention; Fig. 2 is a rear elevation thereof, and Figs. 3 and 4 are side elevations respectively of either end of Figs. 2 and 1, showing more clearly the positions of the pointers.

In the drawings, like characters of reference refer to the same parts.

As far as I know, no system of signaling the intended direction of movement of automobiles has been adopted, and it is the object of my invention to devise a cheaply made yet efficient contrivance for this purpose which will indicate the intended direction of movement of an automobile, irrespective of his position, to a driver of another car therebehind. Frequently the driver of an automobile turns to the opposite direction to that in which his hand points, and the result is that collisions frequently occur. I signal simultaneously at both sides of a car, by means of a pointer preferably in the form of an arrow so that the driver of a car will know exactly in what direction the driver in a car ahead intends to take, whether he has vision of the signal at one or both sides of said car.

A and B are pointers pivoted each on an arm C so as to have vertical movement thereon. Each arm C is pivoted in a bracket D so as to have horizontal movement thereon. The brackets D are carried by any suitable part of the vehicle body or chassis conventionally indicated at E. The ends *a* of the pointers A and B are preferably coupled together by any suitable means such as a rod F, the ends of which are preferably hinged thereto as shown at *b*. In the position of the parts illustrated in Figs. 1 and 4, the direction of movement of the vehicle is ahead. Should the driver wish to stop, he will move the rod F in the direction indicated by arrow in Fig. 3 and so move the pointers A and B on their arms C to occupy substantially a vertical position, as shown in Fig. 3.

Should he wish to turn to the left or right, he will, through the medium of the rod F, shift the pointers A and B into the dotted positions shown in Fig. 1. In case the driver of an automobile behind another automobile has vision of only one side of the car ahead, this will not interfere with his reading of the signal, because he will either see the head or tail of a pointer.

The pointers will be preferably formed like arrows, though any desired shape may be given thereto. The head and tail of a pointer may be colored as desired, and of course any suitable signals visible at night may be associated therewith in any manner, well-known in the prior art.

The chief point of novelty in my invention resides in the fact that the signal is given simultaneously at both sides of the vehicle and may be read aright by a driver at the rear having vision of only one signal.

While I have described what I consider to be the best embodiment of my invention, to obtain the movements set forth, it must be understood that the principle may be embodied in various forms, and I desire not to be limited beyond the requirements of the prior art and the terms of my claims.

In order to signal that he wishes to back, it will only be necessary for the driver to reverse the position of the pointer shown at Fig. 3 so that the arrow head will point downward.

What I claim is:

1. The combination with a motor vehicle, of a pair of pointers located one at each side of said vehicle; an arm for each of said pointers on which the same has vertical movement; a bracket for each of the said arms to permit the same to have horizontal movement, said brackets adapted to be carried by said vehicle, and means having hinged-connection with each of the said pointers near the tail ends thereof, whereby the same are substantially simultaneously moved.

2. The combination with a motor vehicle, of a pair of pointers located one at each side of said vehicle; an arm on which each of said pointers is pivotally mounted substantially midway its ends so as to provide for vertical movement; a bracket adapted to support each of the said arms to provide for horizontal movement of each of the said pointers, said brackets adapted to be carried by said vehicle, and means having hinged connection with each of the said pointers near the tail ends thereof whereby the same are substantially simultaneously moved; the signaling position, to turn, of said pointers disclosing the head of one thereof at one side of the car, and the tail end of the other thereof at the other side of the car.

LOUIS CORNELIOUS SCHRAG.